(12) United States Patent
Zietlow et al.

(10) Patent No.: US 8,540,839 B2
(45) Date of Patent: Sep. 24, 2013

(54) METHOD OF MAKING RESEALABLE MULTI-PLY LABELS

(75) Inventors: Robert C. Zietlow, Neenah, WI (US); Patrick A. Young, Appleton, WI (US)

(73) Assignee: WS Packaging Group, Inc., Green Bay, WI (US)

(*) Notice: Subject to any disclaimer, the term of this patent is extended or adjusted under 35 U.S.C. 154(b) by 0 days.

(21) Appl. No.: 13/591,287

(22) Filed: Aug. 22, 2012

(65) Prior Publication Data

US 2012/0312460 A1 Dec. 13, 2012

Related U.S. Application Data

(62) Division of application No. 12/722,229, filed on Mar. 11, 2010, now Pat. No. 8,273,434.

(51) Int. Cl.
*B29C 65/00* (2006.01)
*B32B 38/04* (2006.01)

(52) U.S. Cl.
USPC ........... 156/270; 156/152; 156/247; 156/265; 156/301; 156/302

(58) Field of Classification Search
USPC ............. 156/152, 247, 257, 268, 270, 263, 156/265, 301, 303, 204, 227
See application file for complete search history.

(56) References Cited

U.S. PATENT DOCUMENTS

| 5,593,749 A * | 1/1997 | Instance | 428/40.1 |
| 2008/0032081 A1* | 2/2008 | Gelsinger | 428/40.1 |

* cited by examiner

*Primary Examiner* — Linda L Gray
(74) *Attorney, Agent, or Firm* — Brian B. Shaw, Esq.; Thomas B. Ryan; Harter Secrest & Emery LLP

(57) ABSTRACT

Resealable multi-ply labels are made from webs along an inline press that include a base label ply and an overlaminate for capturing onserts between them. The base label plies carry an adhesive layer on the bottom surface for mounting the resealable multi-ply labels to articles. The base plies each include a hinge area, an attachment area, a tab area, and an intermediate area separating the hinge area from the attachment area. The overlaminates form permanent bonds with both the hinge areas and the tab areas of the base plies and form reusable bonds with the attachment areas of the base plies. The permanently bonded tab areas of the base plies provide access for releasing the overlaminates from the attachment areas of the base plies and exposing the onserts.

17 Claims, 4 Drawing Sheets

METHOD OF MAKING RESEALABLE MULTI-PLY LABELS

CROSS-REFERENCE TO RELATED APPLICATION

This application is a division of U.S. patent application Ser. No. 12/722,229 filed Mar. 11, 2010, which application is hereby incorporated by reference.

TECHNICAL FIELD

The invention relates to multi-ply labels, particularly resealable multi-ply labels, providing additional printable label space beyond the footprint dimensions of the labels and to manufacturing methods for constructing such labels along inline presses.

BACKGROUND OF THE INVENTION

The amount of space available for the labels on products or product packaging can be less than the amount of space that is needed for conveying a desired amount of information to consumers. Such products, which include pharmaceuticals and cosmetics, often require additional label space for listing ingredients, directing usage, and otherwise fulfilling regulatory requirements. Additional label space is also useful for such purposes as brand promotion.

Multi-ply labels provide additional label space by incorporating overlapping printable surfaces within an articulated structure that allows the overlapping printable surfaces to be relatively moved into positions for viewing. For example, panels can be hinged and swung into view for revealing a back side of the swung panels as well as the front side of any panel immediately beneath. The panels can be fan-folded or otherwise bound together and released for unfolding or pivoting into view. Resealable multi-ply labels include reusable bonds that allow interior panels to be released from a closed position for viewing and restored to the closed position with the reusable bonds intact.

Resealable multi-ply labels of this sort are disclosed in U.S. Pat. No. 6,749,916 to Matthews et al., which is commonly owned with this application. The known resealable multi-ply labels, which are sold under the trade name EasyTab® labels, include three primary substrates (referred to as plies) that are mounted on a carrier web prior to their application to articles. The three plies include a base label ply, an upper label ply, and an overlaminate. The base label ply includes an adhesive layer for mounting the labels to articles. The adhesive layer of the base label ply also temporarily holds the labels on a release surface of the carrier web. The overlaminate also includes an adhesive layer that bonds the overlaminate to areas of both the upper label ply and the base label ply. The upper label ply is die cut leaving a main area and an offset tab area, which are both permanently bonded to the overlaminate. Cut away sections of the upper label ply expose areas of the base label ply, namely, a hinge area and an attachment area. The base label ply, with the exception of the hinge area, is covered by a release layer. Accordingly, the adhesive layer of the overlaminate forms a permanent bond with the hinge area of the base label ply and forms a reusable bond with the attachment area of the base label ply.

The overlaminate can be clear, i.e., transparent or at least translucent, to reveal printing on the topside of the upper label ply, which largely corresponds to the printed area of a conventional label. In addition, the overlaminate together with the bonded upper label ply can be released from the attachment area of the base label ply and pivoted about the hinge area of the base label ply for revealing printing on the underside of the upper label ply and on the topside base label ply. A tab, which is formed by bonding the offset tab area of the upper label ply to the overlaminate, provides a ready grip for releasing the overlaminate together with the main area of the upper label ply from its reusable bond to the base label ply. The main areas of both the upper label ply and the base label ply function as viewable panels for increasing label space. One or more intermediate printable plies can be affixed in staggered contact with the adhesive of the overlaminate to form a multi-sheet booklet for providing more label space.

SUMMARY OF THE INVENTION

The invention, among its preferred embodiments, improves upon other resealable multi-ply labels by simplifying the design and manufacture of the resealable multi-ply labels. In contrast to other resealable multi-ply labels, a resealable multi-ply label preferred for the practice of the invention makes additional use of a base label ply and replaces an upper label ply with the face panel of an onsert (e.g. a printable piece carried by one of the plies), particularly for capturing multiple label panels between an overlaminate and the base label ply. A tab, which is affixed to the overlaminate for providing a gripping surface, is drawn from the base label ply instead of from an upper label ply, and a panel, which is also affixed to the overlaminate for providing additional the label space, is drawn from an onsert instead of from the upper label ply. The preferred design eliminates a layer (the upper label ply) while providing more flexibility for accommodating multi-panel onserts. The onserts can be booklets formed by binding a plurality sheets or by folding a single sheet.

One version of the invention as a resealable multi-ply label includes a base ply having top and bottom surfaces and an adhesive layer on the bottom surface of the base ply for mounting the resealable multi-ply label to an article. An onsert displays at least one of text and graphics. An overlaminate captures the onsert between the overlaminate and the top surface of the base ply, which includes a hinge area, an attachment area, a tab area, and an intermediate area separating the hinge area from the attachment area. The tab area is separated from the attachment area of the base ply. The bottom surface of the base ply within the tab area of the base ply is effectively devoid of adhesive. The overlaminate permanently bonds to both the hinge area and the tab area on the top surface of the base ply and reusably bonds to the attachment area on the top surface of the base ply.

Preferably, the permanently bonded tab area of the base ply provides access (i.e., a finger grip) for releasing the overlaminate from the attachment area of the base ply. The overlaminate is releasable from the attachment area of the base ply and pivotable together with the permanently bonded tab area about the hinge area for accessing the onsert.

The onsert preferably has a face panel, and the overlaminate is preferably permanently bonded to the face panel. The overlaminate is preferably transparent or at least translucent for revealing the text or graphics displayed on the face panel. The onsert can include additional panels that are connected together but viewable by folding or unfolding the panels. The overlaminate is releasable from the attachment area of the base ply together with both the permanently bonded tab area of the base ply and the permanently bonded face panel of the onsert and is pivotable about the hinge area for revealing the additional panels of the onsert.

Another version of the invention as a method of making a succession of resealable multi-ply labels includes advancing a base web, having a base ply with an adhesive backing carried on a release liner, along an inline press. The adhesive backing on the base ply is deadened within tab areas of a succession of base label plies. In a cutting operation through the base ply, the tab areas are separated from attachment areas of the base label plies. An overlaminate web, which is also advanced along the inline press, is laminated to the base web capturing printable panels between the overlaminate web and the base label plies. The laminating operation forms permanent bonds between the overlaminate web and both the tab areas and hinge areas of the base label plies and forms reusable bonds between the overlaminate web and the attachment areas of the base label plies. A cutting operation through the overlaminate web separates individual resealable multi-ply labels carried along the inline press on the release liner.

Before deadening the adhesive backing within the tab areas, the base ply is preferably delaminated from the release liner for exposing the adhesive backing within the tab areas of the base label plies. After deadening the tab areas, the base ply is preferably re-laminated to the release liner for supporting the base ply on the release liner.

An intermediate web is also preferably advanced along the inline press and arranged, such as by folding or binding, into the printable panels. The printable panels can be applied to either one of the base web and the overlaminate web in advance of the step of laminating the overlaminate web to the base web. In addition to cutting through the overlaminate web, both the base ply and the printable panels can also be through cut in the same operation to separate the individual resealable multi-ply labels carried along the inline press on the release liner. The same cutting operation can be arranged to intersect the cuts through the base ply that separate the tab areas from the attachment areas for also separating the tab areas from a remainder of the base ply.

Preferably, the overlaminate web includes an adhesive backing. A release layer is applied to the attachment areas of the base label plies while excluding the release layer from the tab areas and the hinge areas of the base label plies. The printable panels preferably include a face panel, and the laminating operation preferably includes forming permanent bonds between the overlaminate web and face panel of the printable panels.

BRIEF DESCRIPTION OF THE DRAWING FIGURES

Figure 3:
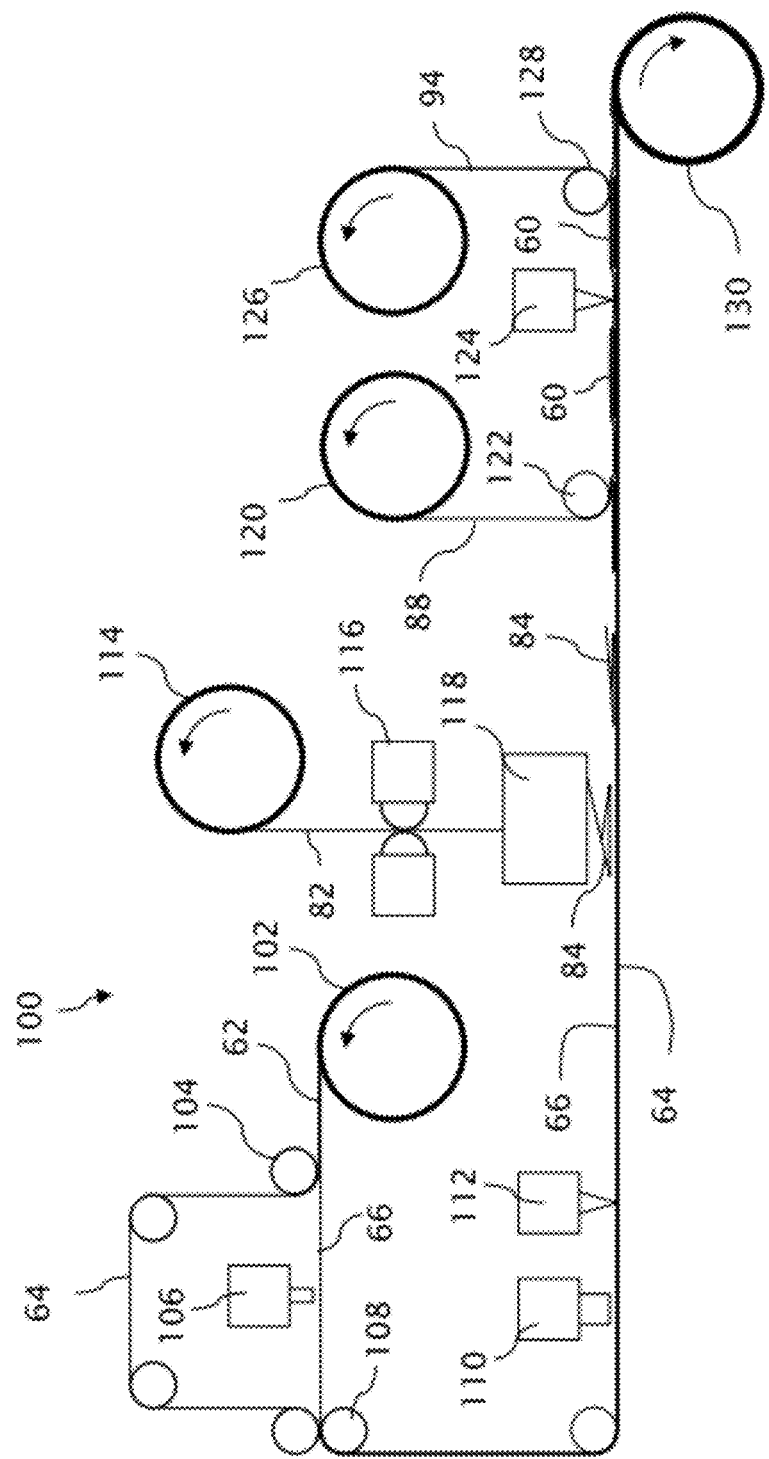
FIG. 3 is a schematic diagram of an inline web press for constructing a succession of resealable multi-ply labels in accordance with the invention.

FIGS. 4A-4F include cut-away plan views of different stages in the construction of the succession of resealable multi-ply labels along the inline web press of FIG. 3.

DETAILED DESCRIPTION OF THE INVENTION

Figure 1:
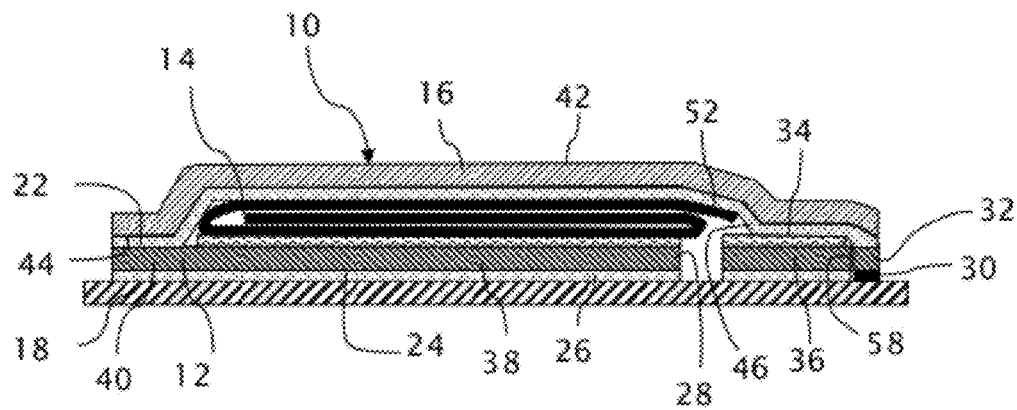
FIG. 1 is a cross-sectional side view of a resealable multi-ply label in accordance with the invention, which label is shown carried on a release liner and expanded in thickness for better illustrating its constituent layers.
Figure 2:
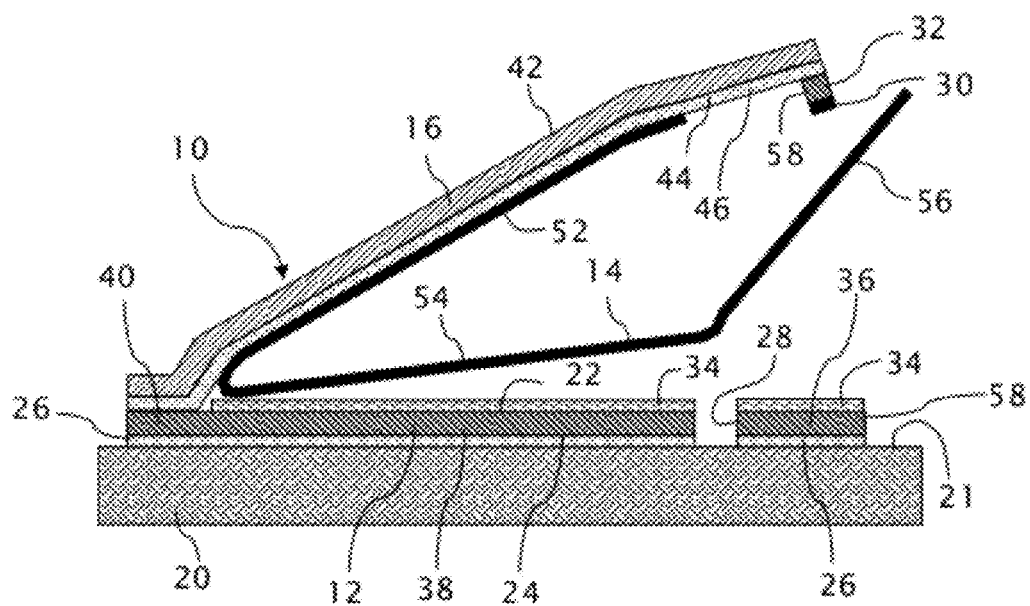
FIG. 2 is a similar cross-sectional side view of the resealable multi-ply label of FIG. 1 mounted on an object intended for labeling and partially opened to expose interior panels of a onsert that is itself partially unfolded in the view.

A resealable multi-ply label 10, which is depicted in FIGS. 1 and 2 as example of a type of label envisioned by the subject invention, includes three main plies: a base ply 12, an onsert 14, and an overlaminate 16. In the view of FIG. 1, the three plies 12, 14, and 16 of the resealable multi-ply label 10 are shown carried on a release liner 18, which provides for protecting and transporting the individual resealable multi-ply label 10 or a group of similar resealable multi-ply labels. In the view of FIG. 2, the three plies 12, 14, and 16 of the resealable multi-ply label 10 are shown mounted on an object 20 intended for labeling.

The base ply 12 has top and bottom surfaces 22 and 24. The bottom surface 24 of the base ply 12 is covered by a pressure-sensitive adhesive layer 26 for permanently mounting the multi-ply label 10 on objects requiring labeling such as the object 20 shown in FIG. 2. Preferably, the pressure-sensitive adhesive layer 26 is a hot melt pressure-sensitive adhesive, but other adhesives could also be used including acrylic, UV curable, solvent based, or water based pressure-sensitive adhesives. Although the object 20 is shown with a planar surface 21, the multi-ply label 10 is specially adapted for mounting on highly curved surfaces. In particular, a gap 28 is formed in the base ply 12 to adapt the base ply 12 to curved surfaces and to resize the base ply 12 relative to the overlaminate 16 so that the multi-ply label 10 conforms to the object surface without buckling.

A small portion 30 of the pressure-sensitive adhesive layer 26 within a tab area 32 of the base ply 12 is deadened or otherwise rendered effectively devoid of adhesive. For example, a varnish can be printed over the pressure-sensitive adhesive layer 26 within a tab area 32 of the base ply 12 to deaden the pressure-sensitive adhesive layer within the tab area 32. Alternatively, the pressure-sensitive adhesive layer 26 could be applied in a pattern over the bottom surface 24 of the base ply 12 excluding the tab area 32. The tab area 32 could also be pre-treated so that the pressure-sensitive adhesive layer 26 applied over the entire bottom surface 24 of the base ply 12 does not adhere to the base ply 12 within the tab area 32.

A release layer 34 (e.g., a varnish or silicone material) is pattern-coated on the top surface 22 of the base ply 12 within both an attachment area 36 of the base ply 12 and an intermediate area 38 of the base ply 12. Areas excluded from coverage of the release layer 34 include the tab area 32 of the base ply 12 and a hinge area 40 of the base ply 12. The tab area 32 is surrounded on three sides by the attachment area 36, and the intermediate area 38 separates the attachment area 36 from the hinge area 40.

The overlaminate 16, which includes top and bottom surfaces 42 and 44, captures the onsert 14 between the overlaminate 16 and the base ply 12. Preferably, the overlaminate 16 is made of a clear film but the overlaminate 16 could also be made of paper or other printable materials including polyester, polypropylene, polyethylene, polystyrene, polyolefin, vinyl or acetate. A pressure-sensitive adhesive layer 46 carried on the bottom surface 44 of the overlaminate 16 permanently bonds the overlaminate 16 to both the tab area 32 and the hinge area 40 of the base ply 12. Preferably, the pressure-sensitive layer 46 is a pressure-sensitive acrylic adhesive, but other adhesives could also be used such as listed for the pressure-sensitive layer 26. Through the intermediacy of the release layer 34, the pressure-sensitive adhesive layer 46 of the overlaminate 16 also forms a reusable bond with the attachment area 36 of the base ply 12. The overlaminate 16 is releasable from the attachment area 36 of the base ply 12 and is pivotable about the hinge area 40 of the base ply 12.

The onsert 14 includes a face panel 52, a bottom panel 54, and an extended panel 56, which are folded together to fit between the overlaminate 16 and the base ply 12 largely within the intermediate area 38 of the base ply 12. The face panel 52 is permanently bonded to the overlaminate 16 through the pressure-sensitive adhesive layer 46. Preferably, the overlaminate 16 is optically transmissive, i.e., transparent or at least translucent, for revealing text or graphics printed on the face panel 52.

A cut 58, e.g., a die cut, through the base ply 12 renders the tab area 32 separable from the surrounding attachment area 36. Thus, the cutout tab area 32 of the base ply 12 is pivotable together with the overlaminate 16 apart from the remainder of the base ply 12 including the attachment area 36, intermediate area 38, and hinge area 40, which remain affixed to the object 20. As shown in FIG. 2, both the cutout tab area 32 of the base ply 12 and the face panel 52 of the onsert 14 pivot together with the overlaminate 16 about the hinge area 40 of the base ply 12. Once the overlaminate 16 is released from the attachment area 36 and pivoted about the hinge area 40, the bottom and extended panels 54 and 56 of the onsert 14 can be unfolded and exposed for viewing. Printing in the form of text or graphics can be applied to opposite side surfaces of the panels 52, 54, and 56 to provide for conveying information, such as about the object 20 or its contents, over an area much larger than the footprint of the multi-ply label 10 on the object 20. Printing can also be applied to the top surface 22 of the base ply 12, and the printing within the intermediate area 38 of the base ply 12 can be similarly rendered visible by releasing and pivoting the overlaminate 16.

The cutout tab area 32 of the base ply 12, as shown affixed to the overlaminate 16 in FIGS. 1 and 2, provides a ready grip for releasing the overlaminate 16 from its reusable bond with the attachment area 36 of the base ply. Unlike the remaining areas of the base ply 12, which include the attachment area 36, the intermediate area 38, and the hinge area 40, the cutout tab area 32 is not bonded to the surface of the object 20. Thus, the cutout tab area 32 can be readily separated from the surface of the object 20 as a starting point for releasing the overlaminate 16 from the attachment area 36 of the base ply 12. The combination of the pressure-sensitive adhesive layer 46 of the overlaminate 16 with the release layer 34 on the attachment area 36 of the base ply 12 provides a reusable bond that allows the overlaminate 16 to be resealed to the attachment area 36 of the base ply 12, preferably over multiple cycles of use.

FIG. 3, together with FIGS. 4A through 4D, depicts the construction of similar resealable multi-ply labels 60 along an inline press 100. From an unwinder 102, a base web 62 of pressure-sensitive label stock is advanced into the inline press 100. The advancing base web 62 is separated at a delaminator 104 into a release liner web 64 and a base ply web 66 having a pressure-sensitive adhesive backing 68. Substrates for both the release liner web 64 and the base ply web 66 are preferably made of paper typical of conventional pressure-sensitive label stocks, but other label substrate materials can be used as required for particular labeling applications or environments of use. A pattern printer 106 applies a deadening varnish layer 70 (see FIG. 4A) to the exposed pressure-sensitive adhesive backing 68 within designated tab areas 72 on the temporarily inverted base ply web 66. A re-laminator 108 rejoins the base ply web 66 to the release liner web 64 for advancing together along the remainder of the inline press 100.

A pattern printer 110 applies a release layer 74 (see FIG. 4B) to designated attachment areas 76 and intermediate areas 78 of the base ply web 66 in registration with the previously printed deadening varnish layer 70 within the designated tab areas 72 on the opposite side of the base ply web 66. A die cutter 112 forms U-shaped cuts 80 for separating the tab areas 72 from the adjacent attachment areas 76 of the base ply web 66. Preferably, both the deadening varnish layer 70 and the release layer 74 slightly overlap the U-shaped cuts 80 so that the cutout tab areas 72 are completely devoid of adhesive and the surrounding attachment areas 76 are completely covered by the release layer 74. Although not shown, the same or a similar die cut station can be used to cut out gaps within the base ply web 66 between the attachment areas 76 and the intermediate areas 78 for use as an expansion or contraction joint.

Figure 4A:
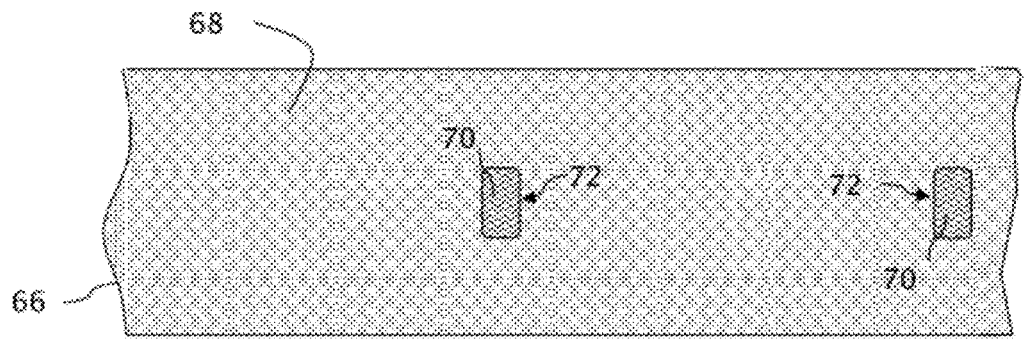
Figure 4B:
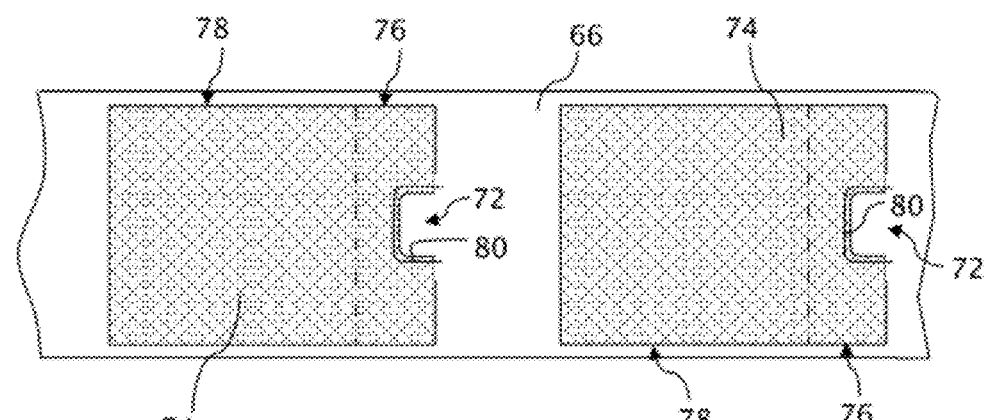
Figure 4C:
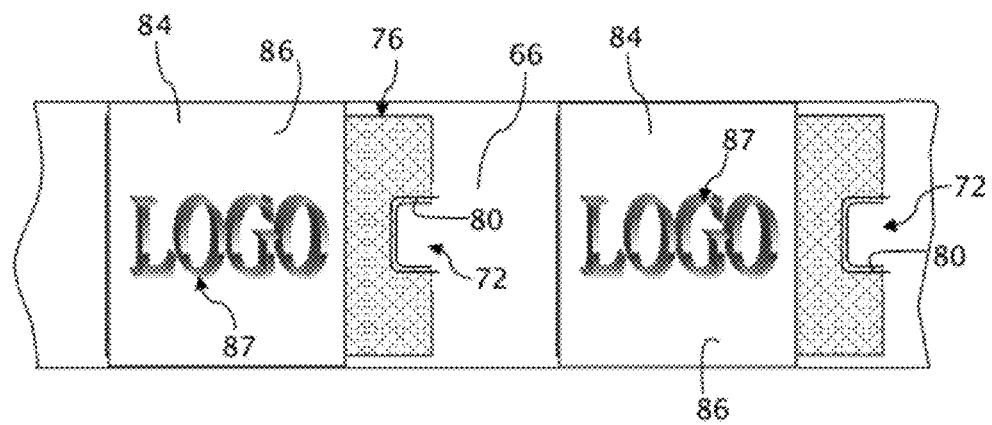
Figure 4D:
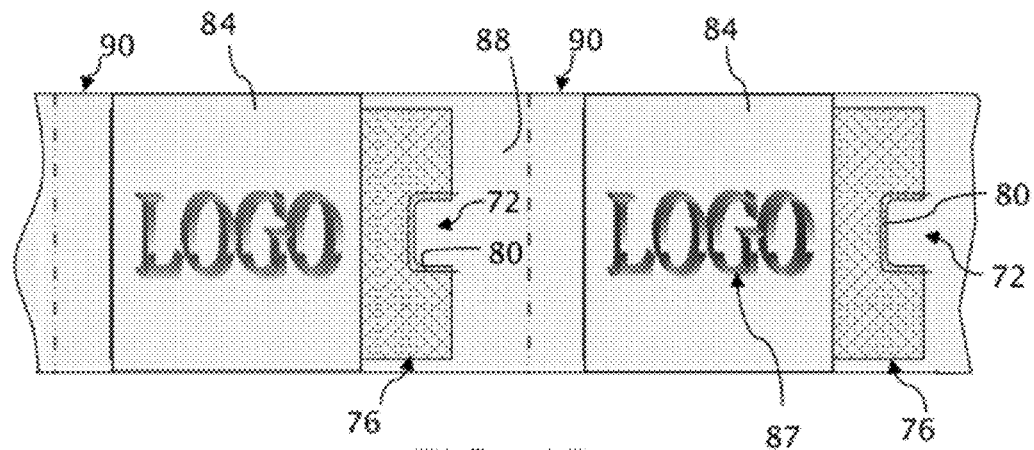
Figure 4E:
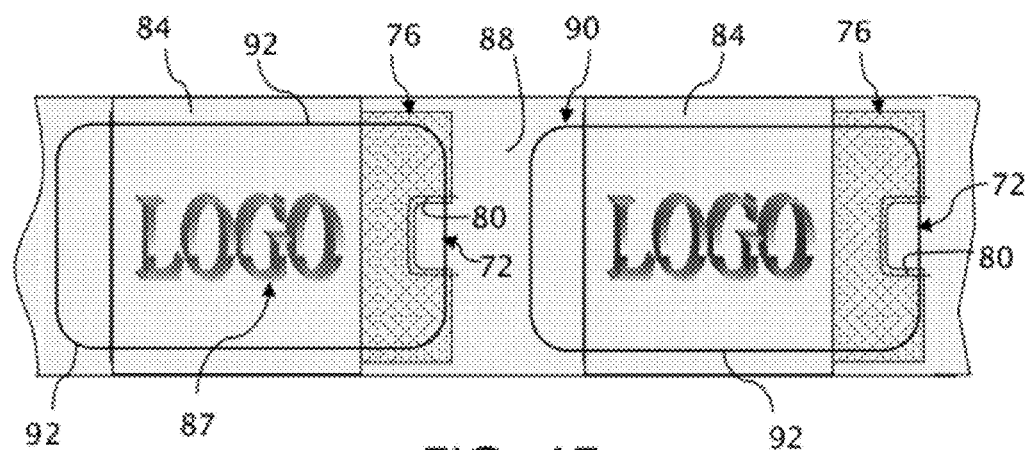
Figure 4F:
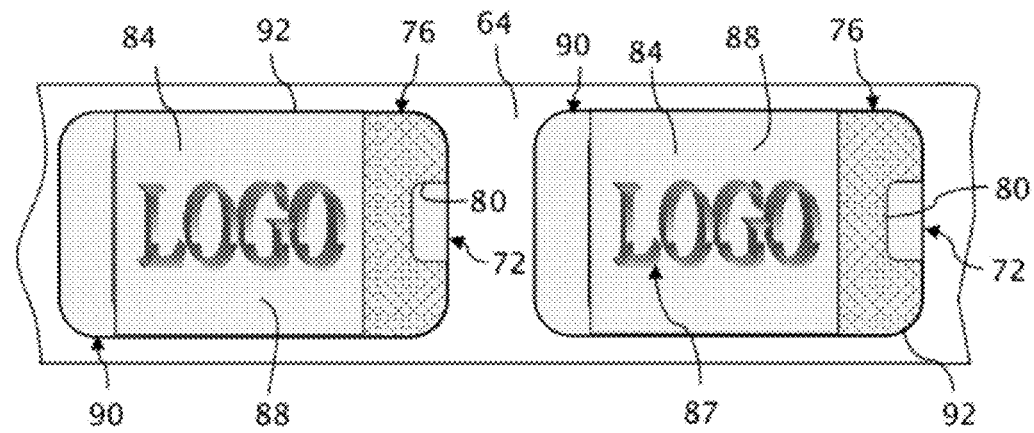

An intermediate web 82 of printable and foldable stock, also preferably made of paper or other printable materials, is advanced into the inline press 100 from an unwinder 114. One or more printing stations 116 print desired text or graphics on opposite sides of the intermediate web 82. A trimming and folding station 118 sizes sections of the intermediate web 82, folds the sections of the intermediate web 82 together into individual onserts 84, and applies the individual onserts 84 to the intermediate areas 78 of the base ply web 66 as shown in FIG. 4C. Face panels 86 of the onserts 84 are preferably printed with information 87 intended to be viewed within the intended footprints of the multi-ply labels 60.

An overlaminate web 88 of pressure-sensitive laminating stock, which includes a pressure-sensitive adhesive backing, is advanced into the inline press 100 from an unwinder 120. Preferably, the substrate of the overlaminate web 88 is made of a clear film but the overlaminate web 88 could also be made of paper or other printable materials. A laminator 122 laminates the overlaminate web 88 to the base ply web 66 (see FIG. 4D) capturing the onserts 84 between the overlaminate web 88 and the base ply web 66. The pressure-sensitive adhesive backing of the overlaminate web 88 forms permanent bonds with hinge areas 90 and the cutout tab areas 72 of the base ply web 66 and with the face panels 86 of the onserts. In combination with the patterned release layer 74, the pressure-sensitive adhesive backing of the overlaminate web 88 also forms reusable bonds with the attachment areas 76 of the base ply web 66. To the extent that the overlaminate web 88 is substantially clear, the printing 87 on the face panels 86 of the onserts 84 is visible through the overlaminate web 88. The overlaminate web 88 can be of a self-wound type, where a top surface of the overlaminate web 88 functions as a release surface against the pressure-sensitive adhesive backing on a bottom surface of the overlaminate web 88, or a release liner can be temporarily laminated against the pressure-sensitive adhesive backing of the overlaminate web 88 for isolating the pressure-sensitive adhesive backing until the overlaminate web 88 is laminated to the base ply web 66.

A die cutter 124 cuts through the overlaminate web 88, the onserts 84, and the base ply web 66 to form the external shape, i.e., outlines 92, of the multi-ply labels 60. The die cut outlines 92 intersect the U-shaped cuts 80 so that the cutout tab areas 72 are completely separated from the remainder of the base ply web 66.

A waste remover 126 removes an unwanted matrix 94 beyond the die-cut outlines 92 of the multi-ply labels 60 and a rewinder 128 winds the matrix 94 into a disposable rolls. A rewinder 130 winds a succession of the multi-ply labels 60 carried on the release liner web 64 into a roll for delivery to a customer or other intended user of the multi-ply labels 60. In place of the rewinder 130, a folder could be used for fanfolding the multi-ply labels 60 on the release liner web 64.

Additional printing stations (not shown) can be positioned along the inline press 90 for printing on other of the printable surfaces including the base ply web 66 and the overlaminate web 88. Alternatively, the intermediate web 82 or the base ply web 66 can be preprinted in a separate offline printing operation and registered to other features for constructing the individual resealable multi-ply labels 60. In addition to arrangements of folded panels, the onserts 84 can take a variety of other forms from single panels printed on one or both sides to multi-panel books that include a plurality of panels bound together or bound separately at one staggered end to the overlaminate web 88. Instead of positioning the onserts 84 on the base ply web 66 prior to laminating the onserts 84 between the overlaminate web 88 and the base ply web 66, the onserts 84 could be first affixed to the overlaminate web 88 prior to their lamination. The onserts 84 can be used for a variety of purposes, particularly as informational pieces, but also as decorative or promotional pieces, such as coupons. Line of perforation can be formed, such as between panels of the onserts, for removing portions of the onserts from the resealable labels.

Although described with respect to a limited number of embodiments, those of skill in the art will appreciate that a variety of modifications and substitutions can be made to the above-described resealable multi-ply labels, their means of delivery, and their methods of manufacture within the overall teaching of this invention.

The invention claimed is:

1. A method of making a succession of resealable multi-ply labels comprising
    advancing a base web, including a base ply with an adhesive backing carried on a release liner, along an inline press,
    deadening the adhesive backing on the base ply within a succession of tab areas along the base ply,
    cutting through the base ply for separating the tab areas from adjacent attachment areas along the base ply,
    advancing an overlaminate web having an adhesive backing along the inline press,
    applying a release layer to the attachment areas of the base ply while excluding the release layer from the tab areas and hinge areas of the base ply,
    laminating the overlaminate web to the base web capturing printable panels between the overlaminate web and the base ply forming permanent bonds with both the tab areas and the hinge areas of the base ply and forming reusable bonds with the attachment areas of the base ply, and
    cutting through the overlaminate web to separate individual resealable multi-ply labels carried along the inline press on the release liner.

2. The method of claim 1 including a step of delaminating the base ply from the release liner in advance of the step of deadening the adhesive backing for exposing the adhesive backing on the base ply within the tab areas of the base ply.

3. The method of claim 2 including a step of re-laminating the base ply to the release liner after the step of deadening for supporting the base ply on the release liner.

4. The method of claim 1 including steps of advancing an intermediate web along the inline press and arranging the intermediate web into the printable panels.

5. The method of claim 4 including a step of applying the printable panels to one of the base web and the overlaminate web in advance of the step of laminating the overlaminate web to the base web.

6. The method of claim 4 in which the step of arranging the intermediate web into the printable panels includes trimming the intermediate web and folding the intermediate web into a stack of panels.

7. A method of making a succession of resealable multi-ply labels comprising
    advancing a base web, including a base ply with an adhesive backing carried on a release liner, along an inline press,
    deadening the adhesive backing on the base ply within a succession of tab areas along the base ply,
    cutting through the base ply for separating the tab areas from adjacent attachment areas along the base ply,
    advancing an overlaminate web along the inline press,
    laminating the overlaminate web to the base web capturing printable panels between the overlaminate web and the base ply forming permanent bonds with both the tab areas and the hinge areas of the base ply and forming reusable bonds with the attachment areas of the base ply, and
    cutting through the overlaminate web, the base ply, and the printable panels to separate individual resealable multi-ply labels carried along the inline press on the release liner.

8. The method of claim 7 in which the step of cutting through the overlaminate web and the base ply includes intersecting the cuts through the base ply that separate the tab areas from the attachment areas for also separating the tab areas from a remainder of the base ply.

9. The method of claim 7 in which the overlaminate web includes an adhesive backing, and including a step of applying a release layer to the attachment areas of the base ply while excluding the release layer from the tab areas and the hinge areas of the base label ply.

10. The method of claim 9 in which the printable panels include a face panel, and the step of laminating includes forming permanent bonds between the overlaminate web and face panel of the printable panels.

11. The method of claim 10 in which the printable panels include additional panels that are pivotally linked to the face panel.

12. The method of claim 11 in which the printable panels are preprinted in a separate off-line operation.

13. The method of claim 10 in which the step of applying a release layer includes applying a release layer to intermediate areas of the base ply between the hinge areas and the attachment areas of the base ply.

14. The method of claim 13 including a step of printing on the intermediate areas of the base ply.

15. The method of claim 7 including steps of:
    delaminating the base ply from the release liner in advance of the step of deadening the adhesive backing for exposing the adhesive backing on the base ply within the tab areas of the base ply, and
    re-laminating the base ply to the release liner after the step of deadening for supporting the base ply on the release liner.

16. The method of claim 7 including steps of:
    advancing an intermediate web along the inline press,
    arranging the intermediate web into the printable panels, and
    applying the printable panels to one of the base web and the overlaminate web in advance of the step of laminating the overlaminate web to the base web.

17. The method of claim 16 in which the step of arranging the intermediate web into the printable panels includes trimming the intermediate web and folding the intermediate web into a stack of panels.

\* \* \* \* \*